United States Patent [19]

Rasmussen

[11] 4,408,185
[45] Oct. 4, 1983

[54] PROCESS FOR TRANSFERRING INFORMATION AND SYSTEM FOR CARRYING OUT THE PROCESS

[75] Inventor: Jørgen B. Rasmussen, Copenhagen, Denmark

[73] Assignee: Elsmark A/S, Denmark

[21] Appl. No.: 201,024

[22] PCT Filed: Nov. 13, 1979

[86] PCT No.: PCT/DK79/00049
§ 371 Date: Jul. 11, 1980
§ 102(e) Date: Jul. 11, 1980

[87] PCT Pub. No.: WO80/01024
PCT Pub. Date: May 15, 1980

[30] Foreign Application Priority Data
Nov. 13, 1978 [DK] Denmark ............................ 5031/78

[51] Int. Cl.³ .................. H04M 11/00; H04Q 5/00
[52] U.S. Cl. ........................... 340/310 A; 340/310 R; 340/825.54; 307/3
[58] Field of Search ........ 340/310 A, 310 R, 310 CP, 340/167 R, 825.54, 825.08, 825.1, 825.7; 307/3, 140, 149; 375/69, 44

[56] References Cited
U.S. PATENT DOCUMENTS

| | | | |
|---|---|---|---|
| 3,462,756 | 8/1969 | Mills | 340/310 R |
| 3,488,517 | 1/1970 | Cowan et al. | 340/310 R |
| 3,525,078 | 8/1970 | Bassott | 340/310 R |
| 3,594,584 | 7/1971 | Woods | 340/310 A |
| 3,714,451 | 1/1973 | Whitney et al. | 340/310 R |
| 3,818,466 | 6/1974 | Honda | 340/310 R |
| 4,106,007 | 8/1978 | Johnston et al. | 340/310 A |
| 4,254,403 | 3/1981 | Perez et al. | 340/310 R |

Primary Examiner—John W. Caldwell, Sr.
Assistant Examiner—Donnie L. Crosland
Attorney, Agent, or Firm—Scully, Scott, Murphy & Presser

[57] ABSTRACT

An arrangement for transferring both power and information on one or more common AC power lines in which a first type of information is transmitted by terminating the current from the power supply in periods which constitute a fraction of a halfwave cycle. The transmission of this first type of information is dependent upon the frequency of the AC power supply. A second type of information is transmitted during the periods in which the current from the power supply is terminated, and the second type of information is transmitted at a higher frequency independent of that of the AC power supply.

7 Claims, 7 Drawing Figures

PROCESS FOR TRANSFERRING INFORMATION AND SYSTEM FOR CARRYING OUT THE PROCESS

The invention relates to a process for transferring information between electrical devices interconnected via at least two power supply lines through which an alternating supply current flows, said lines being also used for transferring information between the electrical devices.

The German Offenlegungsschrift No. 2 428 173 discloses a technique by means of which the supply current to a plurality of electrical devices is essentially cut off in one or more subsequent halfwave intervals to thereby transfer information to the electrical devices which have means for detecting one or more missing halfwaves.

This technique suffers from the drawback that certain forms of loads do not function satisfactorily when the supply current is cut off for the duration of a halfwave interval. For example, lamps show an inconvenient flicker in this technique. This drawback is particularly pronounced when a high rate of information is desired which implies cutting away many halfwaves in a predetermined, relatively dense pattern. Another disadvantage of said technique is that the maximum rate of information is limited by the frequency of the supply current.

The object of the invention is to provide a process making it possible to transfer information on the power supply lines without said drawbacks.

This object is achieved in that, depending upon a first type of information to be transferred, current flow through the power supply lines is blocked fully or partially in positionally determined periods constituting a fraction of a halfwave interval, and in that one or more of the devices transmit a second type of information on the power supply lines at least in some respective ones of said periods in which, as opposed to the first type of information, the second type of information is not dependent upon the frequency of the current supply.

By cutting-off current only for a fraction of a halfwave interval and preferably adjacent a current zero-crossing, the reduction in power supply during the transfer of the first type of information will be significantly smaller than the reduction in power caused by the prior art. The rate of information of the second type of information is not limited by the frequency of the current supply, so information may be transferred at a great velocity on the power supply lines themselves, i.e. without the use of special data lines, because the second type of information is transmitted during the periods in which the current supply source is disconnected. The current supply source will accordingly not act as a load on the transmission of the second type of information which may therefore be effected with a significantly lower consumption of power than would normally be required.

Blocking of a power supply line is normally initiated at a time which is synchronized with the zero-crossing of the supply current, and as allowance must be made for the possibility of a certain phase displacement between current and voltage on the power supply lines, the periods in which the power supply lines are disconnected may become unnecessarily long if blocking is ended a predetermined time after the zero-crossing of the supply voltage. Ending of said blocking a predetermined time after the zero-crossing of the supply current allows a necessary and sufficient duration of the periods to be achieved in which the power supply line is disconnected. Another advantage is that the duration of said periods is well-defined which means that the second type of information may be transmitted during the entire period mentioned.

The invention also relates to a system for carrying out the process, said system being characterized by the fact that it comprises change-over means arranged to cut off, in response to a first type of information, current flow in positionally determined periods which constitute a fraction of a halfwave interval, and that at least some of the devices have detector means for positional determination of said periods and have control means and transmission means arranged to transmit a second type of information on the power supply lines during said periods, at least one of the devices having means for receiving the second type of information.

The system of the invention allows the second type of information to be transmitted on the power supply lines when said lines are essentially disconnected from the current supply source, the devices capable of transmitting the second type of information having means for determining when the current supply source is disconnected and transmitting the second type of information in a state where the current supply source does not act as a load on the transmission. As change-over means is preferably used a triac (two controlled rectifiers of opposite polarity) which possesses the property that it carries current in both directions when a control signal is applied, while without this control signal it exhibits great resistance to current flow in both directions when the current becomes zero the first time.

The time when the power supply line is initially disconnected is perferably controlled synchronously with the zero-crossing of the supply voltage, and the features set forth in claim 4 permit a well-defined duration of the periods in which the current supply cource is disconnected, as has previously been mentioned.

Claim 5 defines a particularly expedient construction of the detector means for positional determination of said periods. At a first time constant for said resistor and capacitor, the detector means may be made independent of the variations in voltage occuring at the beginning of said period, and at a second time constant for the resistor and capacitor the detector means may be made sensititive to the variations in voltage occurring at the end of said period. A diode is coupled over the resistor so that the capacitor is rapidly re-charged in the direction opposite the conduction direction of the light diode.

Thus, it will be understood that the system according to the invention is generally applicable for transfer of information via power supply lines. In adverse circumstances, there is a remote risk of transients disturbing the various detector circuits. However, the system of the invention may be made extremely insensitive to such disturbances by building the controller together with logic circuits capable of performing error detecting and error correcting operations. The combination, as provided by the invention, of said circuits is excellently suitable for being constructed as a single, integrated circuit, as is stated in claim 6. The integrated circuit is arranged to process all direct current signals and is preferably galvanically separated from the power supply lines, e.g. by means of optical couplers.

The integrated circuit may e.g. be incorporated in a microcomputer so that the system of the invention may serve both as power supply for and mutual communication between several data units.

The invention will be explained more fully in the following description of some embodiments with reference to the drawing, in which FIG. 1 shows diagrammatically a system with an information transmitter and a plurality of devices connected in parallel thereto.

FIGS. 2A-C show various curves serving to explain the mode of operation,

Figure 1:
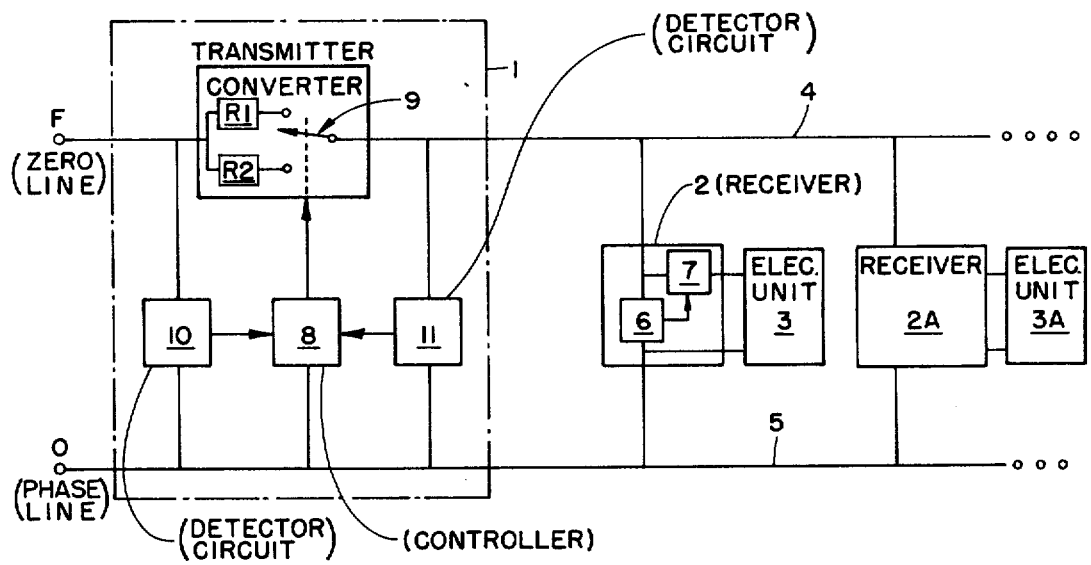

In FIG. 1 there is shown an information transmitter 1 which is arranged to introduce information into power supply lines 4 and 5 for a plurality of devices connected thereto. The individual devices comprise each a receiver 2, 2A . . . and a power consuming unit 3, 3A . . . , which parts will be described later.

The transmitter 1 is connected to for example an ordinary 220 volts alternating voltage network having a zero and a phase line, O and F respectively. The zero-conductor is passed directly through the transmitter 1, while a change-over means with a converter 9 is inserted in series with the phase line, said converter being arranged to connect a large and a small resistor respectively (R1 and R2). The converter 9 is controlled by a controller 8 receiving activation signals from circuits 10 and 11, respectively. Ideally, the resistance of one of said resistors is zero, while that of the other resistor is infinite, but to obtain rapid connection/disconnection a semi-conductor device is, in practice, used as converter, permitting the achievement of a sufficiently large difference between the resistances in practice. A preferred semi-conductor device may be a triac comprising two controlled rectifiers of opposite polarity, and in the following the invention will be explained with a triac.

Figure 2A:
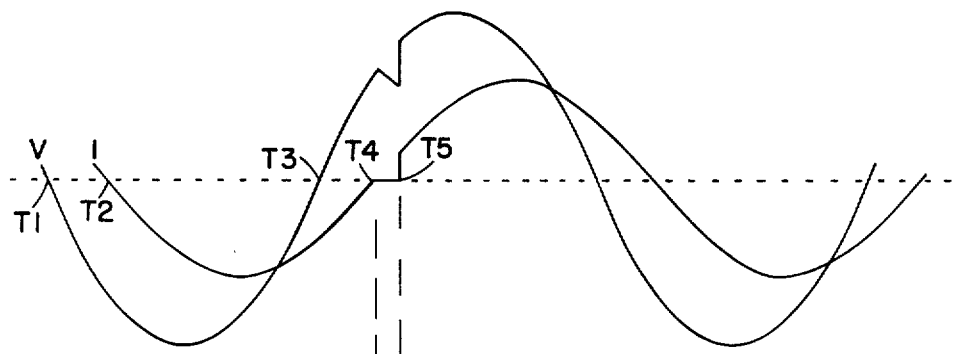

The system of the invention is arranged to transmit and receive information of a first type as well as to transmit and receive information of a second type. The first type of information comprises information transferred by briefly disconnecting a power supply line, the second type of information comprising information which is transmitted via a power supply line while said line is disconnected from a current supply source. Below, the mode of operation with respect to the first type of information will be described first with reference to FIGS. 2A-C, while the mode of operation with respect to the second type of information will be described later with reference to FIG. 4. FIG. 2A shows the output voltage V and the output current I from the transmitter 1 when the change-over means is substantially short-circuited, apart from the period between T4 and T5. In the latter period, current passage through the change-over means, that is the triac, is essentially cut-off, leading to the drop in voltage V shown in the drawing. The connected units 2, 2A . . . are arranged to detect this irregularity in voltage so that information may be transferred from the transmitter 1 to the other units by cutting-off the current through the triac momentarily within a halfwave. According to the invention there may be several interruptions of a short duration within each halfwave, but for the sake of clarity only the interruption shown in FIG. 2A will be explained. To reduce transient noise current interruption is preferably initiated in the zero-crossing (T4) of the current, which may be obtained merely be removing the control signal from the triac whereby it automatically cuts off the current in the zero-crossing. When the controller 8 has been signalled to emit an impulse on the power supply lines 4 and 5, the control signal is taken in time from the triac before the time T4, for example at the time T3, when the voltage passes zero. This voltage zero crossing is detected by means of the circuit 10 shown in FIG. 1. At the time T5 a control signal is again applied to the triac so that the phase line is connected to the supply network. The time T5 may be determined by a predetermined delay from the time T3, but this involves the drawback of an unnecessarily long interruption of current when the phase difference T2 less T1 is small. To obtain the necessary, but shortest possible current interruption of a well-defined duration, the circuit 11 shown in FIG. 1, is arranged to determine the time T4 by detecting the voltage V, permitting the determination of the time T5 as a fixed delay with respect to the time T4. Thus, provision is made for a detectable change in voltage within such a short period that the devices connected to the power supply lines 4 and 5 are not affected noticeably by said current interruption. Said interruption of current is moreover effected so as to minimize transient noise and, as explained above, is initiated and ended at a well-defined time independent of the phase and frequency concerned.

The circuit 10 shown in FIG. 1 may be a commercially available zero-crossing circuit preferably optically connected to the zero and phase line and emits a synchronization signal to the controller 8.

Figure 3:
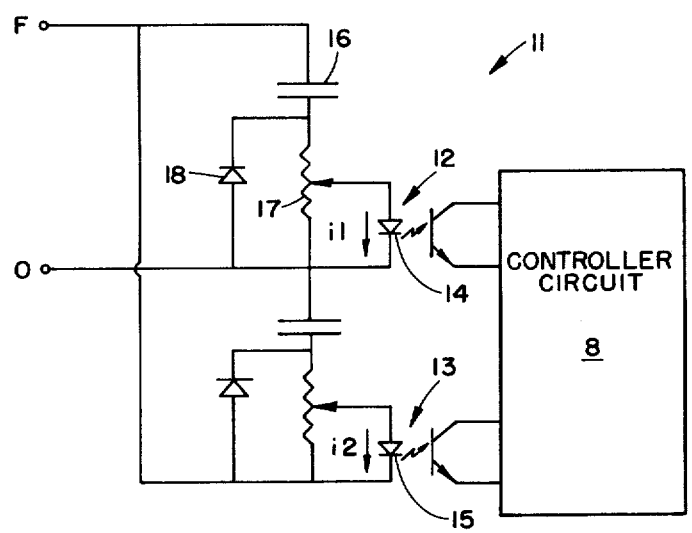
FIG. 3 shows an embodiment of a detector circuit.
Figure 2B:
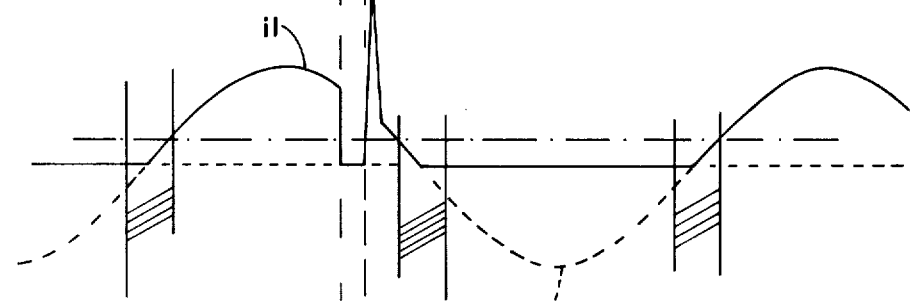

FIG. 3 illustrates an embodiment of the circuit 11 shown in FIG. 1. This detector circuit comprises two uniform halves of opposite polarity, and for this reason only one half will be described. The circuit is partly connected to the zero and phase line as shown in the figure and is provided with a connection to the controller 8 via an optical coupler 12, 13 for each half. FIG. 2B shows the current 11 and 12, respectively, through the respective light diodes 14, 15 of the optical couplers. FIG. 2B is shown such that the resistor 17 gives rise to no essential phase shift away from the phase shift caused by the capacitor 16, and the light diode 14 is connected over the resistor 17 such that the dash-and-dot line shown in FIG. 2B indicates the transitional area between on (above the line) and off below the line) states of the light diode. The curve on FIG. 2B will then be readily understood, the change in the differential coefficient (at the time T4 on FIG. 2A) of the voltage having the effect that current through the light diode 14 stops flowing simultaneously with an initial discharge of the capacitor 16 through the diode 18. When at the time T5 voltage V increases rapidly, a relatively strong current impulse is generated through the light diode 14 which then immediately begins lighting again. It will be understood that the moment when the light diode 14 goes out, indicates when current I (FIG. 2A) passes through zero, and this state is detected in the controller 8 in that the light sensitive transistor of the optical coupler changes from an on to an off state.

It should be noted that the shown detector circuit has the dead zones indicated by hatching on FIG. 2B which require that the controller 8 must be able to establish whether the disconnected state of the light sensitive transistor occurs outside these dead zones depending upon the position of the potentiometer 17. When the dead zones are located as shown in FIG. 2B, that is symmetrically around the maximum values of the voltage, the detector will be equally suitable for inductive as well as capacitive load on the power supply lines, but it may be preferred to adjust the resistor 17 with respect to the capacitor 16 so as to obtain a phase displacement of the signal shown in FIG. 2B.

Figure 2C:
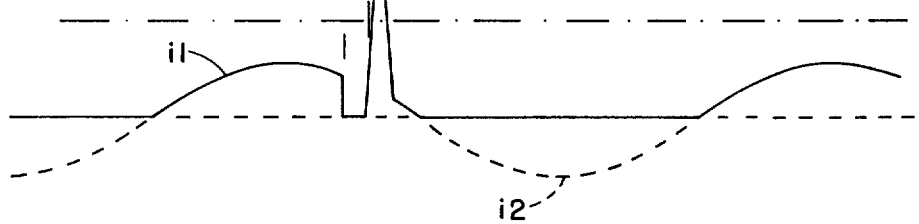

FIG. 2C shows the same signals as those described above in connection with FIG. 2B, but where the values of the components 16 and 17 are changed so that the transistion between the on and off state of the light diode is located completely outside the maximum current through the light diode when no signals are transmitted on the power supply lines. It will then be readily understood that the detector circuit shown in FIG. 3 may also be employed for detecting the time T5 (FIG. 2A) when the light diode of the optical coupler begins lighting, which is tantamount to the associated light sensitive transistor becoming conductive. The detector circuit shown in FIG. 3 may thus be used for detecting time T4 as well as time T5, and reacts of course to irregularities both in the positive and negative voltage shifts owing to the two uniform halves of opposite polarity.

FIG. 1 shows the units 2 comprising a circuit 6 and a circuit 7, where the circuit 6 may correspond to the circuit shown in FIG. 3 which is adjusted to the function shown in FIG. 2C, while circuit 7 corresponds to the change-over means, i.e. preferably a triac, which is already described.

Figure 4:
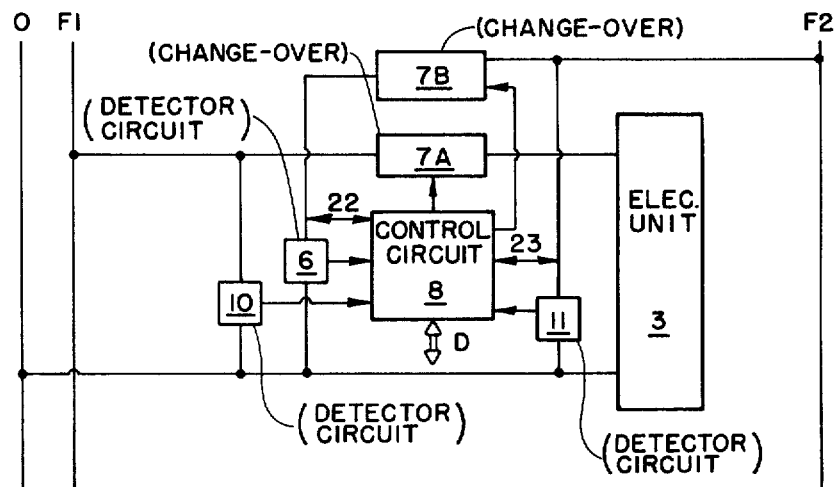
FIG. 4 shows a block diagram of an embodiment of the system of the invention.

FIG. 4 shows a block diagram of a general embodiment of a device for the system of the invention. This circuit is arranged to receive information and power supply via the phase line F1, the circuits 6, 7A and 8 being active during reception. The circuit may also emit information and power, and in this case the circuits 7B, 8, 10 and 11 are active. The two functions may readily be understood by means of the above explanation of said active circuits. Thus, the general circuit shown in FIG. 4 permits the construction of a branch structure or hierarchy of such general circuits, opening many opportunities of transfer of combined power and information. In addition to its ability to transmit and receive information of the first type, viz. the one previously explained where the rate of transmission is restricted by the frequency of the current supply, the device shown in FIG. 4 can according to the invention also transmit and receive information of a second type which is not restricted by the frequency of the current supply. This is effected via the connections 22 and 23 shown in FIG. 4 under the control of the control circuit 8 which via a data connection D communicates with a data processing unit for the first as well as the second type of information.

According to the invention, information of the second type is transmitted in the periods in which the phase line it is desired to use for the transmission is cut off from the current supply source so that said source does not act as a load on the transmission.

When information of the second type is to be transmitted from the device shown in FIG. 4 to the line F1, the circuit 8 transmits information via the connection 22 when it receives a signal from the detector circuit 6 which tells it when the line F1 is disconnected from the current supply source. Transmission of the second type of information must thus wait until such brief interruption occurs. If it is desired to transmit information of the second type on the line F2 from the device shown in FIG. 4, the device itself may optionally disconnect the line F2 from the current supply source by means of the change-over means 7B which is controlled from the control circuit 8. For the duration of the interruption, information of the second type may be transmitted from the control circuit 8 via the connection 23 to the line F2.

The transmission itself of the second type of information may e.g. be brought about with a plurality of capacitors which are connected to the power supply lines via respective cut-off means. The cut-off means may be controlled so that the capacitors are first charged to the supply voltage and then discharged at subsequent, predetermined moments when the power supply lines are disconnected from the power supply source, and carry impulses representing the second type of information on the power supply lines.

Transmission of the second type of information may of course also be brought about in a manner known per se by means of known transmission circuits. Likewise, the control circuit 8 may contain means known per se for receiving the second type of information via the connections 22 and/or 23, the detector means, already described, being capable of activating the receiver means in the positionally determined periods in which information of the second type may occur on a current supply line.

Figure 5:
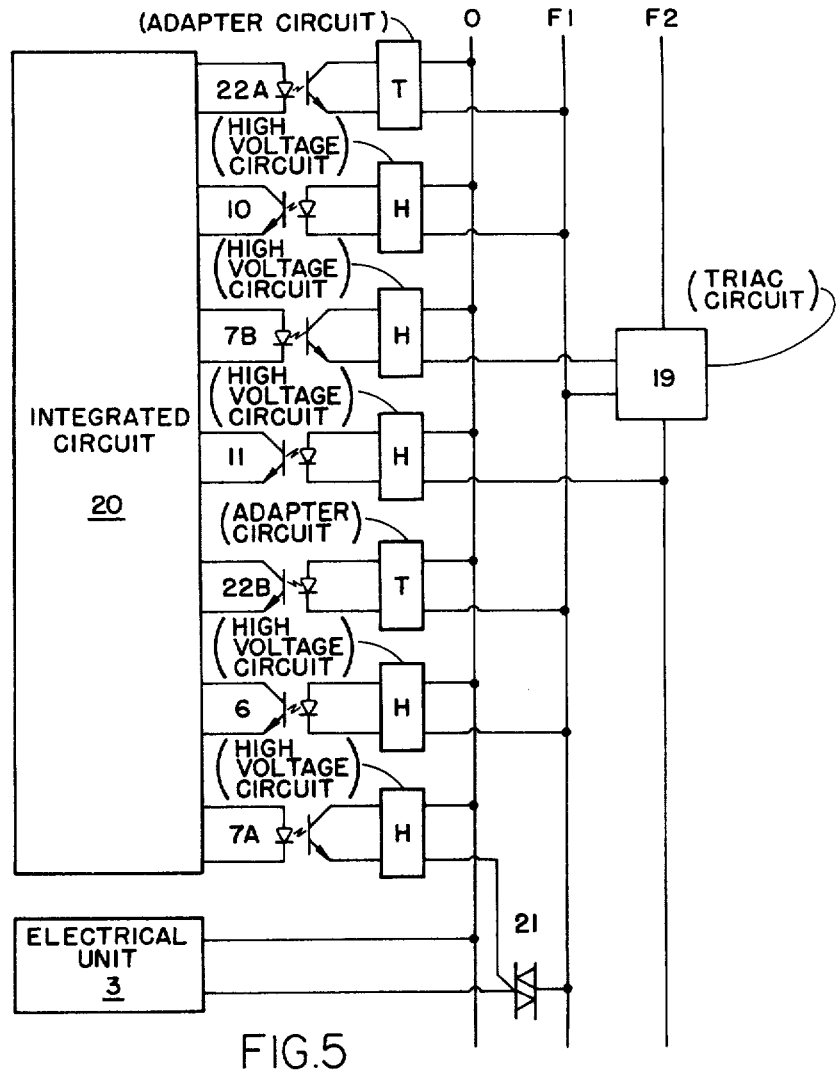
FIG. 5 shows another embodiment for constructing the system of the invention.

FIG. 5 shows an integrated circuit 20 for performing the operations explained in connection with FIG. 4, among others. The shown circuit 19 may be a triac like the one designated 21 which connects the power consuming unit 3 to the line F1 and disconnects it therefrom. In this case power (from F1) and information may be transmitted to units connected to the line F2 (in FIG. 5 below the circuit 19). However, the circuit 19 may also be a generator capable of emitting impulses on the line F2 when said line is not connected to other voltage sources. Transfer of the second type of information is preferably brought about via an adapter circuit T which is galvanically separated from the circuit 20 by means of optical couplers as shown at 22A and 22B (corresponding couplings for the connection 23 in FIG. 4 are not shown in FIG. 5).

Apart from the high voltage circuits designated H and T, such as the one shown in FIG. 3, the circuit 20 may comprise all the other, previously described circuits which are separated from the high voltage lines for example by means of optical couplers. The connections, indicated in FIG. 5, to the circuit 20 have relation to the circuits shown in FIG. 4 where two sets of connections are present at 6 and 11, cf. FIG. 3. It will be understood that the optical couplers and the high voltage units may also be integrated into the circuit 20 which may comprise the triac 21 and the circuit 19 when relatively low power is transmitted.

The circuit 20 may, however, be a microcomputer capable of performing logic operations, for example the control of the dead zones of the detector circuits as mentioned above. The circuit 20 is also able to detect and correct errors in the data which are transferred on the power supply lines, making the system of the invention very immune to errors if now and then disturbing transients occur on the phase lines. Thus there is provided an inexpensive and reliable system for remote control of power consuming devices, such as lamps, motors, data units, etc., and which makes it possible to transmit information on power supply lines in both directions, i.e. both upstream and downstream transmission.

I claim:

1. A process for transferring information between electrical devices interconnected via at least two power supply lines which at least carry an alternating supply current, and wherein current in a power supply line is at least partially blocked for transferring information, characterized by the operation that depending upon a first type of information to be transferred, current flow in a power supply line is blocked at least partially in positionally determined periods constituting a fraction of a halfwave interval, and that a second type of information is transmitted on the power supply lines from at least one of the devices in at least one of said positionally determined periods.

2. A process according to claim 1, wherein blocking of a power supply line is initiated essentially simultaneously with the zero-crossing of the supply current from one polarity to the opposite polarity, characterized by the operation that said blocking is ended a predetermined time after said zero-crossing of the supply current.

3. A system for carrying out the process according to claim 1, comprising a plurality of electrical devices which are interconnected via at least two power supply lines and have at least one change-over means inserted in series with a power supply line, said change-over means being arranged to interrupt at least partially current flow in certain periods in response to a control signal, said electrical devices having means for detecting said interruptions, characterized by the operation that the change-over means (9) is arranged to interrupt, in response to a first type of information, current flow in positionally determined periods which constitute a fraction of a halfwave interval, and that at least one of the devices have detector means (11) for positional determination of said periods and have control means (8) and transmission means (D) arranged to transmit a second type of information on the power supply lines during said periods, at least one of the devices having means for receiving the second type of information.

4. A system according to claim 3, and in which the power supply lines are disconnected in synchronism with the zero-crossing of the supply current from one polarity to the opposite polarity, characterized by the operation that the change-over means (9) is controlled by a controller (8) which is arranged to receive a signal from a detector means (11) representing the initial disconnection of the change-over means (9) from the associated power supply line and is arranged to end said disconnection a predetermined time after the said initial disconnection.

5. A system according to claim 3 or 4, characterized by the operation that the detector means (11) comprises an optical coupler (12, 13) whose light sensitive transistor is connected to the controller (8), and whose light diode (14,15) is connected to a tap on a resistor (17) which in series with a capacitor (16) is connected between the power supply lines.

6. A system according to claim 3 or 4, characterized by an integrated circuit (20) comprising said control and detector means for processing all the signals represented by low voltage signals, said integrated circuit (20) being connected to the power supply lines via an optical coupler.

7. A system for carrying out the process according to claim 1, comprising a plurality of electrical devices which are interconnected via at least two power supply lines and have at least one change-over means inserted in series with a power supply line, said change-over means being arranged to interrupt fully or partially current flow in certain periods in response to a control signal, said electrical devices having means for detecting said interruption, characterized by the operation that the change-over means (9) is arranged to interrupt, in response to a first type of information, current flow in a predetermined period of time after the zero-crossing of the supply current from one polarity to the opposite polarity, said period of time constituting a fraction of a halfwave interval, and that at least one of the devices have detector means (11) for positional determination of said periods and have control means (8) and transmission means (D) arranged to transmit a second type of information on the power supply lines during said periods, at least one of the devices having means for receiving the second type of information.

* * * * *